Dec. 30, 1958 J. W. DICKEY ET AL 2,866,328
FREEZEMETER
Filed July 8, 1953 2 Sheets-Sheet 1

WITNESS:
Esther M. Stockton

INVENTORS
John W. Dickey
E. Elliott Hood
BY
Clinton S. Janes
ATTORNEY

INVENTORS
John W. Dickey
E. Elliott Hood
BY
Clinton L. Janes
ATTORNEY

United States Patent Office
2,866,328
Patented Dec. 30, 1958

2,866,328
FREEZEMETER

John W. Dickey, Newfield, and E. Elliott Hood, Elmira, N. Y., assignors to Bendix Aviation Corporation, Elmira Heights, N. Y., a corporation of Delaware Application July 8, 1953, Serial No. 366,674

3 Claims. (Cl. 73—17)

The present invention relates to a freezing-point tester for anti-freeze liquids and more particularly to a device for determining the freezing point of liquids which are difficult to solidify even at very low atmospheric temperatures. The present disclosure involves improvements on the freeze-tester disclosed in the patent to Dickey 2,633,736, issued on April 7, 1953, adapting it for convenient use with liquids having very low freezing points.

In the development of a practical freeze-tester or field instrument for determining the freezing point of arctic coolant liquids for internal combustion engines, it has been found that coolants of high concentration may not solidify in the instrument even at temperatures far below their thawing points, unless measures are taken to initiate and promote the crystallization of the sample. The most practical ways of overcoming this difficulty so far developed involve agitation of the chilled sample and/or "seeding" the sample with crystals of frozen liquid.

It is an object of the present invention to provide a novel freeze-tester having manually operable means, conveniently arranged, for agitating the sample to be tested, while maintaining it in contact with the cooling means.

It is another object to provide such a device which permits continuous observation of the sample throughout the testing process.

It is another object to provide such a device in which the sample is insulated from the ambient atmosphere, to reduce the transmission of external heat to the sample.

Further objects and advantages will be apparent from the following description taken in connection with the accompanying drawing in which.

Figure 1:
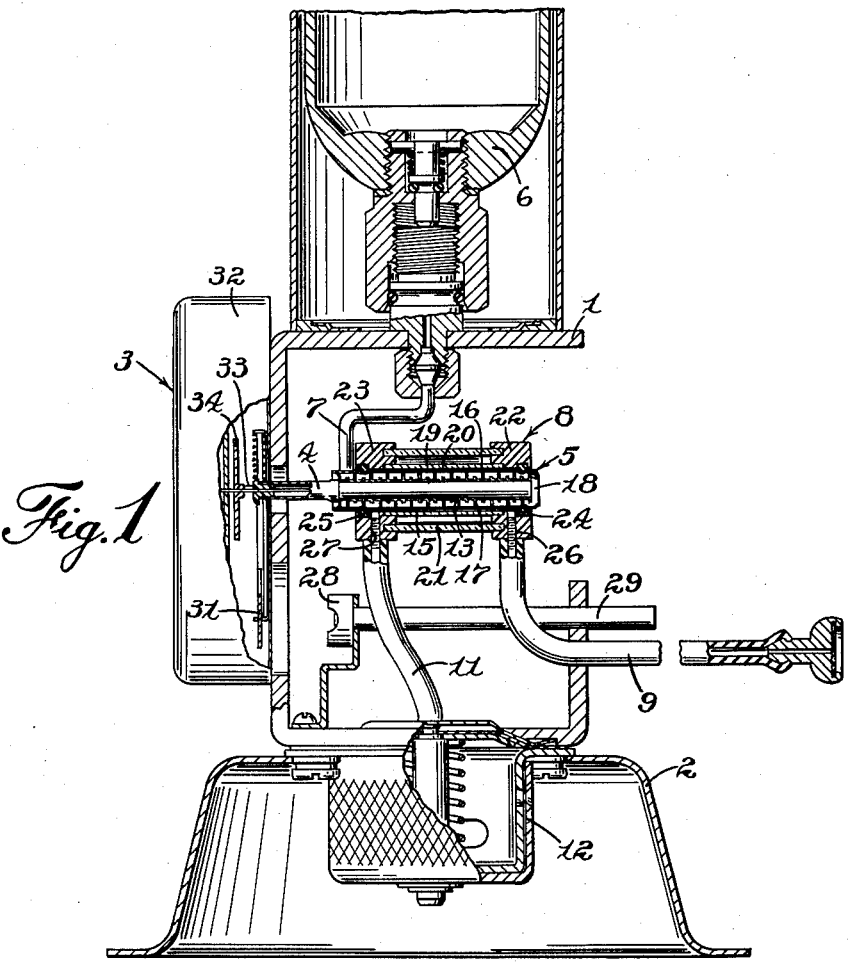
Fig. 1 is a vertical substantially mid-sectional view of a freeze-tester instrument incorporating one preferred embodiment of the invention.

In Fig. 1 of the drawing there is illustrated a freeze-point testing instrument comprising a frame 1 mounted on a pedestal 2 and carrying a thermometer 3 having a stem 4 with the heat-sensitive element therein extending into the frame. A heat exchanger element indicated generally by numeral 5 is mounted on the thermometer stem 4, and a flask 6 containing liquefied carbon dioxide is mounted on the upper portion of the frame 1 and connected by a tube 7 to the heat exchanger to conduct expanded refrigerating gas released from the flask into the interior of the heat exchanger.

A tubular sample-holding and agitating member indicated generally by numeral 8 is journaled on the heat exchanger and is provided with an inlet tube 9, and with an outlet tube 11 which connects with a rotary pump 12 located within the pedestal 2 beneath the frame 1.

Figure 2:
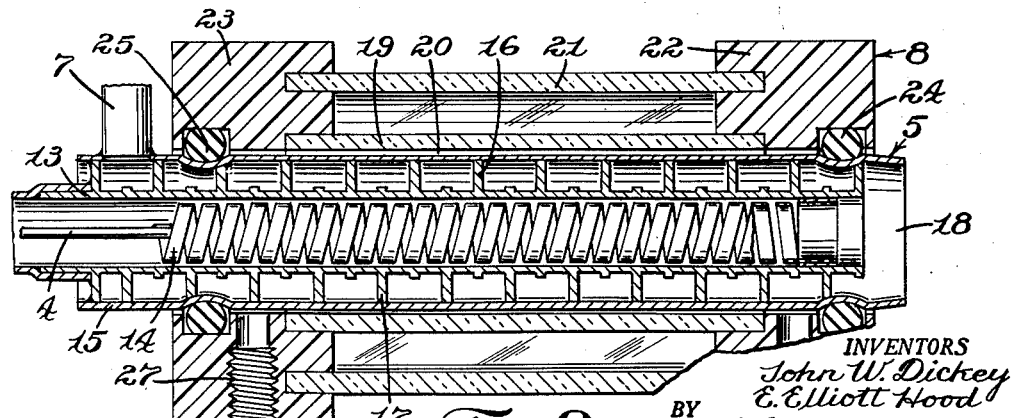
Fig. 2 is an enlarged sectional detail of the heat exchanger and sample-holding and agitating structure.

By reference to Fig. 2 of the drawing, it will be noted that the heat exchanger 5 comprises an inner cylinder 13 formed as an extension of the thermometer stem 4 in a position to surround the heat-sensitive element 14 of the thermometer, and an outer cylinder 15 of larger diameter coaxial with the inner cylinder 13, having a smooth, polished external surface. Cylinders 13 and 15 are provided with radial flanges 16 and 17 having chordal flats constituting a labyrinthian path from the point of attachment of the frost tube 7 to the opposite end 18 of the heat exchanger, where the carbon dioxide gas is permitted to escape after performing its function of reducing the temperature of the heat exchanger.

The tubular sample-holder and agitator is here shown in the form of a double-walled tube of transparent material such as, for instance, glass or a suitable plastic. The two concentric tubes 19 and 21 are mounted at their ends in cylindrical blocks 22 and 23 of suitable material which are journaled on the outer cylinder 15 of the heat exchanger by means of sealing rings 24 and 25 which are preferably seated in annular contracted portions of said cylinder.

The inner tube 19 has a slightly larger internal diameter than the external diameter of the cylinder 15 of the heat-exchanger, leaving a narrow cylindrical space 20 between the cylinder and tube for the reception of a sample of the liquid to be frozen.

The supporting blocks 22 and 23 are provided with threaded receptacles 26 and 27 for attachment of the sample conducting tubes 9 and 11. The tubes 9 and 11 are made of suitable flexible material which permits manual oscillation of the sample-holder 8 to cause agitation of the sample confined between the holder and the heat exchanger during the freezing process.

In the operation of this embodiment of the invention, a sample of the liquid to be tested is drawn into the space 20 surrounding the heat exchanger 5 by manipulation of the pump 12 while the free end of the inlet tube 9 is immersed in the liquid. The heat exchanger is then chilled by permitting carbon dioxide gas to be released from the flask 6 and conducted through the tube 7 to the heat exchanger from which it escapes at the opposite end. The mixture of expanded gas and snow traversing the heat exchanger cools it below the freezing temperature of the sample, and at the same time, the sample-holding member 8 is grasped by the operator and oscillated manually in order to agitate the sample by the relative movement of the tube 19 and cylinder 15. The freezing process is observed through the transparent tubes 19 and 21, and when complete as evidenced by the white crystalline appearance of the sample and resistance to rotation of the holder 8, the carbon dioxide gas is shut off.

The frozen sample is then permitted to thaw by gradual absorption of heat from the surrounding atmosphere, and when the crystalline cloudiness of the sample disappears, the reading of the thermometer 3 is taken and recorded as the freezing point of the sample.

If desired, means may be employed for arresting the thermometer needle at the thawing point of the sample. As here shown, this means is in the form of a magnet 28 mounted on a slidable plunger 29 for movement into and out of proximity to an armature 31 in the casing 32 of thermometer 3. This armature is arranged, when attracted by the magnet 28, to move an arresting element 33 into engagement with a flange 34 on the thermometer needle staff, thus holding the needle from rotation. The plunger 29 is normally in the position illustrated in Fig. 1, but may be manually advanced into position to attract the armature 31 when the sample has been observed to have reached the thawing point.

Figure 3:
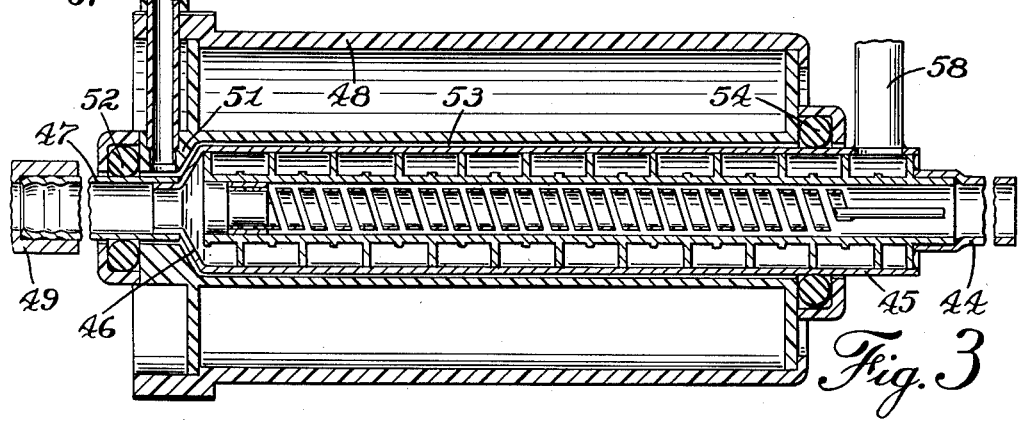
Fig. 3 is a view similar to Fig. 2 showing an embodiment of the invention in which the heat exchanger and the sample-holder are constructed to operate as a sampling pump.

In Fig. 3 of the drawing, there is illustrated a variation of the structure shown in Figs. 1 and 2 for the purpose of simplifying the sampling structure. As shown in Fig. 3, the heat exchanger 45 which constitutes an extension of the thermometer stem 44 is substantially similar to that illustrated in Figs. 1 and 2, except that the end 46 of the heat exchanger is contracted in diameter and is provided with a cylindrical extension 47 to which an exhaust tube 49 for the freezing gas may be attached. The sample-holding and agitating member 48 is also similar to that illustrated in Figs. 1 and 2 with the exception that it is provided with a portion 51 of reduced diameter which loosely surrounds the extension 47 of the heat exchanger 45 and is provided with a packing ring 52 forming a slidable bearing on said extension. The space 53 between the heat exchanger 45 and the sample-holder 48 is closed at the other end by a packing ring 54 having a sliding bearing on the heat exchanger 45.

A sample inlet tube 57 is mounted on the heat exchanger and communicates with the sample-holding space 53 surrounding the heat exchanger. This tube is made of flexible material and is of such length as to permit longitudinal reciprocation of the sample-holder on the heat exchanger while the free end of the tube is immersed in the liquid to be tested.

A frost tube 58 is attached to the inlet end of the heat exchanger 45, to conduct chilled gas and snow from the carbon dioxide flask not illustrated.

The operation of this embodiment of the invention is the same as that in the first embodiment except for the manner in which the sample is obtained. In the present embodiment the end of the tube 57 is immersed in the liquid to be tested, and the sample-holder 48 is manually reciprocated on the heat exchanger 45, thus pumping the liquid through said tube into the space 53 between said members and expelling the entrained air. The sample holder 48 is then returned to its original position as illustrated, and the freezing process is performed by admitting carbon dioxide through the tube 58 while oscillating the sample-holder manually, after which the thawing and observation of the thawing point take place as before described.

Figure 4:
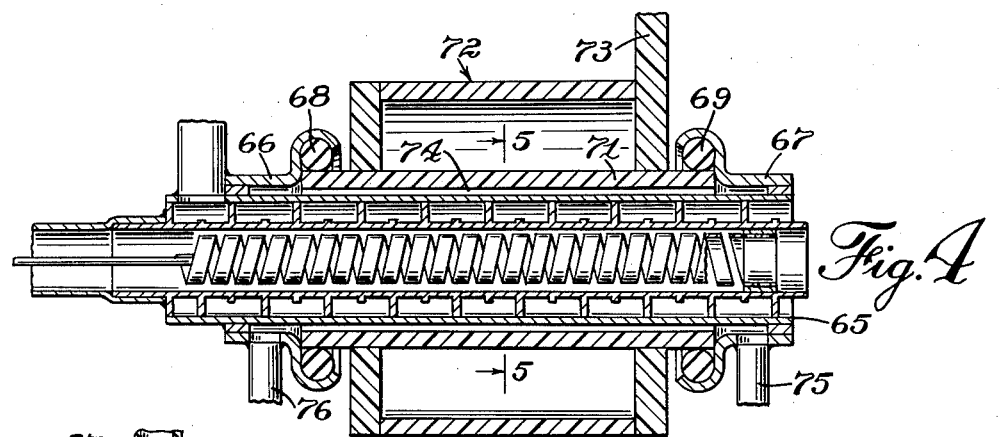
Fig. 4 is a view similar to Fig. 2 of an embodiment of the invention in which agitation of the sample is secured without flexure of the conducting tubing.

In Fig. 4 of the drawing there is illustrated a further modification of the invention in which the necessity for flexible tubing is eliminated. As there shown, the heat exchanger 65 has mounted at its ends a pair of thimbles 66 and 67 containing packing rings 68 and 69 forming rotary supports for the ends of the inner tube 71 of the sample-holder 72. The sample-holder is thus capable of rotation by any suitable means such as a handle 73, while the space 74 between the sample-holder and heat exchanger 65 is closed by the packing rings 68, 69.

The sample is drawn in through the inlet tube 75 and the suction tube 76 in the same manner as illustrated and described in the first embodiment of the invention, and the operation of the instrument is the same as first described.

Figure 5:
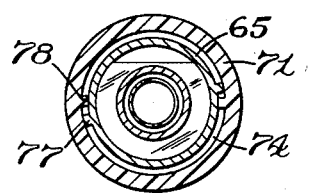
Fig. 5 is a section taken substantially on the line 5—5 of Fig. 4.

In order to increase the agitation or turbulence of the sample caused by oscillation of the sample-holder, longitudinal fins or ribs 77, 78 may be formed on, or attached alternately to, the outer surface of the heat exchanger 65 and the inner surface of the inner tube 71 of the sample-holder, as illustrated in Fig. 5. With this arrangement, oscillation of the sample-holder causes the intervening liquid to be pumped back and forth over said ribs, thus thoroughly agitating the sample.

Figure 6:
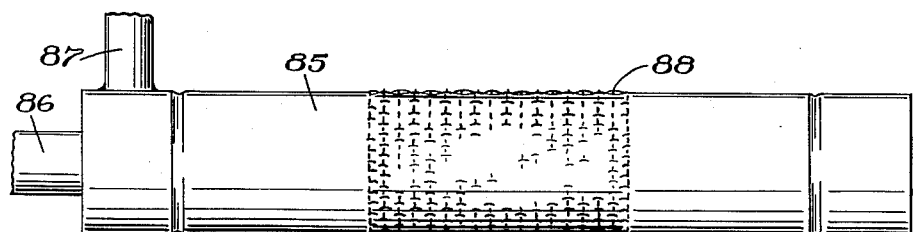
Fig. 6 is a detail of a heat exchanger with a reticulated sample-holder and agitator slidably journaled thereon.

Fig. 6 shows a very simplified form of apparatus for holding a sample of liquid to be tested in contact with a heat exchanger while securing agitation of the sample. As there shown, a heat exchanger 85 having a polished cylindrical external surface forms the terminal portion of the thermometer stem 86 and is chilled by expanded carbon dioxide gas and snow admitted through tube 87. Sleeve 88 of fine wire mesh is slidably and rotatably mounted on the exterior of the heat exchanger and is provided with an extension 89 for convenient manipulation. A few drops of the sample to be tested are applied to the surface of the heat exchanger and sleeve 88, and the sleeve is rotated and reciprocated on the heat exchanger while the heat exchanger is chilled until crystallization of the sample is secured. This crystallization is brought about both by the agitation of the sample and also by a crystal seeding process utilizing minute ice crystals resulting from atmospheric condensation. After the sample has been thus frozen, the thawing point is visually observed and recorded as above described.

Although certain embodiments of the invention have been described in detail, it will be understood that other embodiments are possible and changes may be made in the design and arrangement of the structure illustrated without departing from the spirit of the invention.

We claim:

1. In a device for determining the freezing point of a low-freezing liquid, a hollow cylindrical heat exchanger, a thermometer having its heat sensitive element within the heat exchanger, means for chilling the heat exchanger, and a tubular sample-holding and agitating member journalled on the heat exchanger; in which the tubular member surrounding the heat exchanger is in the form of a double-walled transparent tube, and including further means for conducting a sample of liquid into the space between the tubular member and heat exchanger and for confining the sample in said space while permitting relative rotation of the tubular member and heat exchanger.

2. A freeze-tester as set forth in claim 1 including further a plurality of partial obstructions located alternately on the exterior of the heat exchanger and on the interior of the surrounding tubular member which partial obstructions are operative to agitate the interposed sample of liquid to be frozen, upon relative oscillation of the tubular member and heat exchanger.

3. In a device for determining the freezing point of a low-freezing liquid, a hollow double-walled cylindrical heat exchanger, means for conducting a freezing agent through the heat exchanger between its inner and outer walls, a thermometer having its heat sensitive element located within the heat-exchanger, a tubular transparent sample-holding and agitating member having a slightly larger internal diameter than the external diameter of the heat exchanger, and means for rotatably mounting the tubular member on the heat exchanger and for preventing escape of liquid from the space between said tubular member and heat exchanger while permitting relative rotation thereof; said heat exchanger having a smooth bright surface and the mounting means for the tubular member on the heat exchanger including sealing and bearing members in the ends of the tubular member slidably and rotatably supporting the tubular member.

References Cited in the file of this patent

UNITED STATES PATENTS

| | | |
|---|---|---|
| 2,635,455 | Staehling | Apr. 21, 1953 |
| 2,658,383 | Chipley | Nov. 10, 1953 |
| 2,732,709 | Dickey | July 8, 1953 |
| 2,773,378 | Hood | Dec. 11, 1956 |
| 2,774,238 | Gerwig | Dec. 18, 1956 |